US012115406B2

(12) United States Patent
Langston

(10) Patent No.: US 12,115,406 B2
(45) Date of Patent: Oct. 15, 2024

(54) WEIGHTED TRAINING EQUIPMENT

(71) Applicant: CAXY Sports, LLC, Pittsburgh, PA (US)

(72) Inventor: Thomas J. Langston, Pittsburgh, PA (US)

(73) Assignee: CAXY Sports, LLC, Pittsburgh, PA (US)

(*) Notice: Subject to any disclaimer, the term of this patent is extended or adjusted under 35 U.S.C. 154(b) by 25 days.

(21) Appl. No.: 17/408,887

(22) Filed: Aug. 23, 2021

(65) Prior Publication Data

US 2021/0379439 A1 Dec. 9, 2021

Related U.S. Application Data

(63) Continuation of application No. 16/201,170, filed on Nov. 27, 2018, now Pat. No. 11,097,146.

(Continued)

(51) Int. Cl.
*A63B 21/072* (2006.01)
*A61H 3/00* (2006.01)
(Continued)

(52) U.S. Cl.
CPC ............ *A63B 21/072* (2013.01); *A61H 3/00* (2013.01); *A63B 21/0601* (2013.01); *A63B 21/0603* (2013.01); *A63B 21/0604* (2013.01); *A63B 59/20* (2015.10); *A63B 59/50* (2015.10); *A63B 59/56* (2015.10); *A63B 59/70* (2015.10);
(Continued)

(58) Field of Classification Search
CPC ....... A63B 21/072; A63B 60/02; A63B 59/70; A63B 21/0601; A63B 59/50; A63B 60/24; A63B 59/20; A63B 59/56; A63B 21/0604; A63B 21/0603; A63B 2102/30; A63B 49/08; A63B 2209/00; A63B 53/14; A63B 53/10; A63B 2102/06; A63B 60/16; A63B 21/0607; A63B 60/08; A63B 2102/02; A63B 2102/14; A63B 2102/182; A63B 2102/22; A63B 2102/24; A63B 2102/32; A63B 2244/19; A63B 2102/04;
(Continued)

(56) References Cited

U.S. PATENT DOCUMENTS

| | | | | |
|---|---|---|---|---|
| 46,062 A | 1/1865 | Angenard | | |
| 377,686 A * | 2/1888 | Moose | .................. | A63B 60/16 473/564 |

(Continued)

FOREIGN PATENT DOCUMENTS

| | | | |
|---|---|---|---|
| CN | 102302845 A * | 1/2012 | |

*Primary Examiner* — Garrett K Atkinson
(74) *Attorney, Agent, or Firm* — Clark Hill PLC

(57) ABSTRACT

Training equipment includes a hollow shaft having a sidewall defining an internal cavity and at least one polymer material filling at least a portion of the internal cavity. The polymer material may fill the entire internal cavity of the hollow shaft. The polymer material may be a visco-elastic polymer material or polyurethane. A spacer or a filler may fill at least a portion of the internal cavity. A method of making weighted training equipment with a hollow shaft having a sidewall defining an internal cavity may include injecting a curable composition into at least a portion of the internal cavity. The method may further include curing the curable composition into a polymer material.

7 Claims, 7 Drawing Sheets

Related U.S. Application Data

(60) Provisional application No. 62/593,423, filed on Dec. 1, 2017.

(51) Int. Cl.

| | |
|---|---|
| ***A63B 21/06*** | (2006.01) |
| ***A63B 59/20*** | (2015.01) |
| ***A63B 59/50*** | (2015.01) |
| ***A63B 59/56*** | (2015.01) |
| ***A63B 59/70*** | (2015.01) |
| ***A63B 60/02*** | (2015.01) |
| ***A63B 60/08*** | (2015.01) |
| ***A63B 60/16*** | (2015.01) |
| ***A63B 60/24*** | (2015.01) |
| ***A63B 102/02*** | (2015.01) |
| ***A63B 102/04*** | (2015.01) |
| ***A63B 102/06*** | (2015.01) |
| ***A63B 102/14*** | (2015.01) |
| ***A63B 102/18*** | (2015.01) |
| ***A63B 102/22*** | (2015.01) |
| ***A63B 102/24*** | (2015.01) |
| ***A63B 102/32*** | (2015.01) |
| ***A63C 11/22*** | (2006.01) |
| *A63B 49/08* | (2015.01) |
| *A63B 53/10* | (2015.01) |
| *A63B 53/14* | (2015.01) |
| *A63B 102/30* | (2015.01) |

(52) U.S. Cl.

CPC .............. *A63B 60/02* (2015.10); *A63B 60/24* (2015.10); *A63C 11/222* (2013.01); *A63B 21/0607* (2013.01); *A63B 49/08* (2013.01); *A63B 53/10* (2013.01); *A63B 53/14* (2013.01); *A63B 60/08* (2015.10); *A63B 60/16* (2015.10); *A63B 2102/02* (2015.10); *A63B 2102/04* (2015.10); *A63B 2102/06* (2015.10); *A63B 2102/065* (2015.10); *A63B 2102/14* (2015.10); *A63B 2102/182* (2015.10); *A63B 2102/22* (2015.10); *A63B 2102/24* (2015.10); *A63B 2102/30* (2015.10); *A63B 2102/32* (2015.10); *A63B 2209/00* (2013.01); *A63B 2244/19* (2013.01)

(58) Field of Classification Search

CPC ............ A63B 2102/065; A63C 11/222; A63C 11/227; A61H 3/00

See application file for complete search history.

(56) References Cited

U.S. PATENT DOCUMENTS

| | | | | | |
|---|---|---|---|---|---|
| 1,665,195 | A * | 4/1928 | Cohn | A63B 59/52 | 473/520 |
| 2,175,685 | A * | 10/1939 | Dieterich | A63B 37/00 | 473/363 |
| 3,834,697 | A * | 9/1974 | McNamara, Jr. | A63B 69/0026 | 482/109 |
| 3,883,629 | A * | 5/1975 | Garner | B32B 27/00 | 264/DIG. 83 |
| 3,923,946 | A * | 12/1975 | Meyer | C22C 32/0094 | 419/48 |
| 4,113,480 | A * | 9/1978 | Rivers | B22F 3/22 | 419/36 |
| 4,690,399 | A * | 9/1987 | Hayashi | A63B 21/075 | 482/50 |
| 5,165,686 | A * | 11/1992 | Morgan | A63B 59/50 | 473/564 |
| 5,174,567 | A * | 12/1992 | Nordstrom | A63B 69/0024 | 473/256 |
| 5,380,002 | A * | 1/1995 | Spector | A63B 41/02 | 273/DIG. 8 |
| 5,452,889 | A * | 9/1995 | Lewinski | A63B 59/50 | 473/519 |
| 5,590,881 | A * | 1/1997 | Jernigan | A63B 60/00 | 473/324 |
| 5,609,336 | A * | 3/1997 | Tashjian | A63B 60/28 | 473/560 |
| 5,665,014 | A * | 9/1997 | Sanford | A63B 53/0466 | 473/345 |
| 6,077,178 | A * | 6/2000 | Brandt | A63B 60/04 | 473/566 |
| 6,767,299 | B1 * | 7/2004 | Chang | A63B 59/52 | 473/519 |
| 7,140,988 | B1 * | 11/2006 | Hinman | A63B 59/51 | 473/566 |
| 7,588,654 | B2 * | 9/2009 | Schindler | A43B 13/20 | 36/35 B |
| 7,963,868 | B2 * | 6/2011 | McGrath | A63B 60/54 | 473/563 |
| 8,113,972 | B2 * | 2/2012 | Dobransky | A63B 59/50 | 473/564 |
| 8,500,609 | B1 * | 8/2013 | Williams | A45B 3/00 | 135/65 |
| 8,858,405 | B2 * | 10/2014 | Agate | A63B 21/0616 | 482/106 |
| 8,864,608 | B2 * | 10/2014 | Rockhill | A63B 69/0002 | 473/549 |
| 9,359,467 | B2 * | 6/2016 | Leibler | B29C 67/24 | |
| 9,511,268 | B1 * | 12/2016 | Levy | A63B 60/24 | |
| 9,833,653 | B2 * | 12/2017 | Bradford | A63B 23/1209 | |
| 10,245,488 | B1 * | 4/2019 | Kays | A63B 60/54 | |
| 2002/0037780 | A1 * | 3/2002 | York | A63B 60/08 | 473/560 |
| 2002/0061796 | A1 * | 5/2002 | Rios | A63B 59/51 | 473/564 |
| 2003/0148836 | A1 * | 8/2003 | Falone | A63B 60/08 | 473/568 |
| 2004/0048696 | A1 * | 3/2004 | Ciesar | A63B 15/005 | 473/457 |
| 2005/0046062 | A1 * | 3/2005 | Stevenson | B22F 3/22 | 264/140 |
| 2007/0072711 | A1 * | 3/2007 | Mallas | A63B 59/50 | 473/564 |
| 2007/0184943 | A1 * | 8/2007 | Davies | A63B 21/0724 | 482/93 |
| 2008/0096738 | A1 * | 4/2008 | Kim | A63B 21/0726 | 482/108 |
| 2008/0127721 | A1 * | 6/2008 | Shields | G01M 1/365 | 473/316 |
| 2009/0247369 | A1 * | 10/2009 | Chang | A63B 21/06 | 482/105 |
| 2010/0081525 | A1 * | 4/2010 | Dobransky | A63B 59/52 | 473/564 |
| 2010/0178981 | A1 * | 7/2010 | Holcomb | A63F 13/98 | 463/37 |
| 2010/0229682 | A1 * | 9/2010 | Chung | C08K 3/00 | 75/230 |
| 2010/0292035 | A1 * | 11/2010 | Huang | A63B 59/52 | 473/564 |
| 2011/0009247 | A1 * | 1/2011 | Januszek | A63B 21/0726 | 482/106 |
| 2012/0046136 | A1 * | 2/2012 | Allen | A63B 60/10 | 264/266 |
| 2012/0214622 | A1 * | 8/2012 | Rockhill | A63B 15/00 | 473/422 |
| 2013/0045823 | A1 * | 2/2013 | Sublett, Sr. | A63B 59/50 | 156/161 |
| 2013/0095984 | A1 * | 4/2013 | Agate | A63B 21/0616 | 482/106 |
| 2014/0088223 | A1 * | 3/2014 | Leibler | B29C 67/24 | 523/400 |
| 2015/0072809 | A1 * | 3/2015 | Palumbo | A63B 59/70 | 473/560 |
| 2016/0354659 | A1 * | 12/2016 | Levy | A63B 59/70 | |

(56) References Cited

U.S. PATENT DOCUMENTS

| | | | | |
|---|---|---|---|---|
| 2017/0259104 A1* | 9/2017 | Bradford | ............ | A63B 21/0603 |
| 2018/0221738 A1* | 8/2018 | Panozzo | ................ | A63B 59/70 |
| 2019/0388757 A1* | 12/2019 | Francken | ............... | A63B 59/70 |

* cited by examiner

WEIGHTED TRAINING EQUIPMENT

CROSS-REFERENCE TO RELATED APPLICATIONS

This application claims priority to U.S. Provisional Patent Application Ser. No. 62/593,423, and U.S. patent application Ser. No. 16/201,170, both titled "Weighted Training Equipment" and filed on Dec. 1, 2017 and Nov. 27, 2018, respectively, the disclosures of which are incorporated by reference herein in their entireties.

BACKGROUND OF THE DISCLOSURE

Field of the Disclosure

The present disclosure relates to weighted training equipment and a method of manufacturing weighted training equipment and, specifically, to weighted training equipment having a shaft wherein a weight is contained within an internal cavity of the shaft.

Description of Related Art

Sports equipment, such as sticks (including ice hockey, roller hockey, field hockey, floor ball, and lacrosse sticks), golf clubs, ski poles (including cross-country and downhill poles), rackets (including tennis, racquetball, squash, and badminton rackets), and bats (including softball and baseball bats) are all designed to have an appropriate weight for maximizing player efficiency during game play. Often, temporary weights are added to the outside of the equipment during training, practice, or physical rehabilitation from an injury in order to assist in the development of specific muscles. Examples of such weights include rings that are placed around an external portion of the shaft of the sports equipment. However, with the weight added so heavily concentrated in a specific portion of the shaft, such exterior weights may negatively affect the athlete's balance, timing, and accuracy while using the weighted sports equipment. Therefore, it is desirable to have weighted sports equipment that has evenly distributed added weight and does not interfere with the athlete's balance, timing, and accuracy.

SUMMARY OF THE DISCLOSURE

The present disclosure is directed to training equipment that may have a hollow shaft with a sidewall defining an internal cavity and at least one weight filling at least a portion of the internal cavity where the at least one weight is made from a polymer material with a first density. In some embodiments or aspects, the polymer material may be a visco-elastic polymer material. In other embodiments or aspects, the polymer material may be a polyurethane. In some embodiments or aspects, the training equipment may also have a filler having a second density different than the polymer material's first density, with the filler provided within at least a portion of the internal cavity. The filler may be a metal powder or polyethylene. In another embodiment, the polymer material may be mixed with the filler, and, after mixing, the polymer material and filler combination may have a third density different than the first density of the polymer material and the second density of the filler.

In some embodiments or aspects, the training equipment may be sports equipment such as an ice hockey stick, a roller hockey stick, a field hockey stick, a floor ball stick, a lacrosse stick, a golf club, a cross-country ski pole, a downhill ski pole, a tennis racket, a racquetball racket, a squash racket, a badminton racket, a softball bat, a baseball bat, or physical therapy equipment.

In some embodiments or aspects, a hollow shaft for use with sports equipment may have a sidewall defining an internal cavity with at least one weight filling at least a portion of the internal cavity, where the at least one weight may have a first polymer material with a first density filling at least a first portion of the internal cavity, and a second polymer material having a second density different from the first density, the second polymer material filling at least a second portion of the internal cavity.

In some embodiments or aspects, a method of making weighted training equipment that has a hollow shaft with a sidewall defining an internal cavity may include injecting a curable composition into at least a first portion of the internal cavity and curing the curable composition into a first polymer material having a first density. In some embodiments or aspects, the curable composition may be provided as two components that solidify after mixing and the two components may be mixed before injecting them together as the curable composition into the internal cavity. A first component of the curable composition may be a polyisocyanate and a second component may be a polyol.

In some embodiments or aspects, the method may include providing an opening extending through the sidewall of the hollow shaft and into the internal cavity before injecting the curable composition into the internal cavity by way of the opening. The first polymer material may be a visco-elastic polymer or a polyurethane.

In some embodiments or aspects, the method may include injecting a second curable composition into at least a second portion of the internal cavity where the second curable composition has a second density different than the density of the first curable composition. In other embodiments or aspects, the method may include inserting a filler into the internal cavity. The filler may be inserted into the internal cavity along with the curable composition creating a second polymer material with a second density different than the first density of the first polymer material. Yet another embodiment includes injecting at least a second curable composition and at least a second filler into at least a second portion of the internal cavity where the second curable composition and second filler together have a third density different from the second density of the first curable composition and filler combination and the first density of the first polymer material. The method may also include inserting a spacer or plug into at least a portion of the internal cavity.

In some embodiments or aspects, the present disclosure may be characterized by one or more of the following numbered clauses:

Clause 1. Training equipment comprising: a hollow shaft having a sidewall defining an internal cavity; and at least one weight filling at least a portion of the internal cavity, wherein the at least one weight is made from a polymer material having a first density.

Clause 2. The training equipment of clause 1, wherein the polymer material is a visco-elastic polymer or polyurethane.

Clause 3. The training equipment of clause 1 or 2, wherein the training equipment further comprises a filler within at least a portion of the internal cavity, wherein the filler has a second density different from the first density.

Clause 4. The training equipment of any of clauses 1-3, wherein the polymer material is mixed with the filler, wherein the mixed polymer material and filler together have a third density different than that of the first density of the polymer material and the second density of the filler.

Clause 5. The training equipment of any of clauses 1-4, wherein the filler is a metal powder or polyethylene.

Clause 6. The training equipment of any of clauses 1-5, wherein the training equipment is sports equipment or physical therapy equipment.

Clause 7. The training equipment of any of clauses 1-6, wherein the training equipment is sports equipment selected from one of an ice hockey stick, a roller hockey stick, a field hockey stick, a floor ball stick, a lacrosse stick, a golf club, a cross-country ski pole, a downhill ski pole, a tennis racket, a racquetball racket, a squash racket, a badminton racket, a softball bat, and a baseball bat.

Clause 8. Training equipment comprising: a hollow shaft having a sidewall defining an internal cavity; and at least one weight filling at least a portion of the internal cavity, wherein the at least one weight comprises a first polymer material having a first density filling at least a portion of the internal cavity and a second polymer material having a second density different than the first density filling at least a second portion of the internal cavity.

Clause 9. A method of making weighted training equipment comprising a hollow shaft having a sidewall defining an internal cavity, the method comprising: injecting a curable composition into at least a first portion of the internal cavity; and curing the curable composition into a first polymer material having a first density.

Clause 10. The method of clause 9, wherein the curable composition is provided as two components that solidify after mixing and the two components are mixed before injecting the curable composition into the internal cavity.

Clause 11. The method of any of clause 9 or 10, wherein a first of the two components of the curable composition is a polyisocyanate, and wherein a second of the two components of the curable composition is a polyol.

Clause 12. The method of any of clauses 9-11 further comprising providing an opening extending through the sidewall of the hollow shaft and into the internal cavity before injecting the curable composition into the internal cavity, wherein the curable composition is injected into the internal cavity through the opening.

Clause 13. The method of any of clauses 9-12, wherein the first polymer material is a visco-elastic polymer or a polyurethane.

Clause 14. The method of any of clauses 9-13, wherein the first polymer material fills the entire internal cavity of the hollow shaft.

Clause 15. The method of any of clauses 9-14, further comprising injecting a second curable composition into at least a second portion of the internal cavity, wherein the second curable composition has a second density that is different from the first density.

Clause 16. The method of any of clauses 9-15, further comprising inserting a filler into at least a portion of the internal cavity.

Clause 17. The method of any of clauses 9-16, wherein the filler is inserted into the internal cavity with the curable composition creating a second polymer material having a second density different than the first density of the first polymer material.

Clause 18. The method of any of clauses 9-17, further comprising injecting at least a second curable composition and inserting at least a second filler into at least a second portion of the internal cavity, wherein the second curable composition and second filler have a third density different from the first and second densities.

Clause 19. The method of any of clauses 9-18, further comprising inserting a spacer or plug into at least a portion of the internal cavity.

BRIEF DESCRIPTION OF THE DRAWINGS

In FIGS. 1A-5B, unless otherwise noted, same reference numbers are used to identify same components in various embodiments.

DESCRIPTION OF THE DISCLOSURE

Figure 1B:
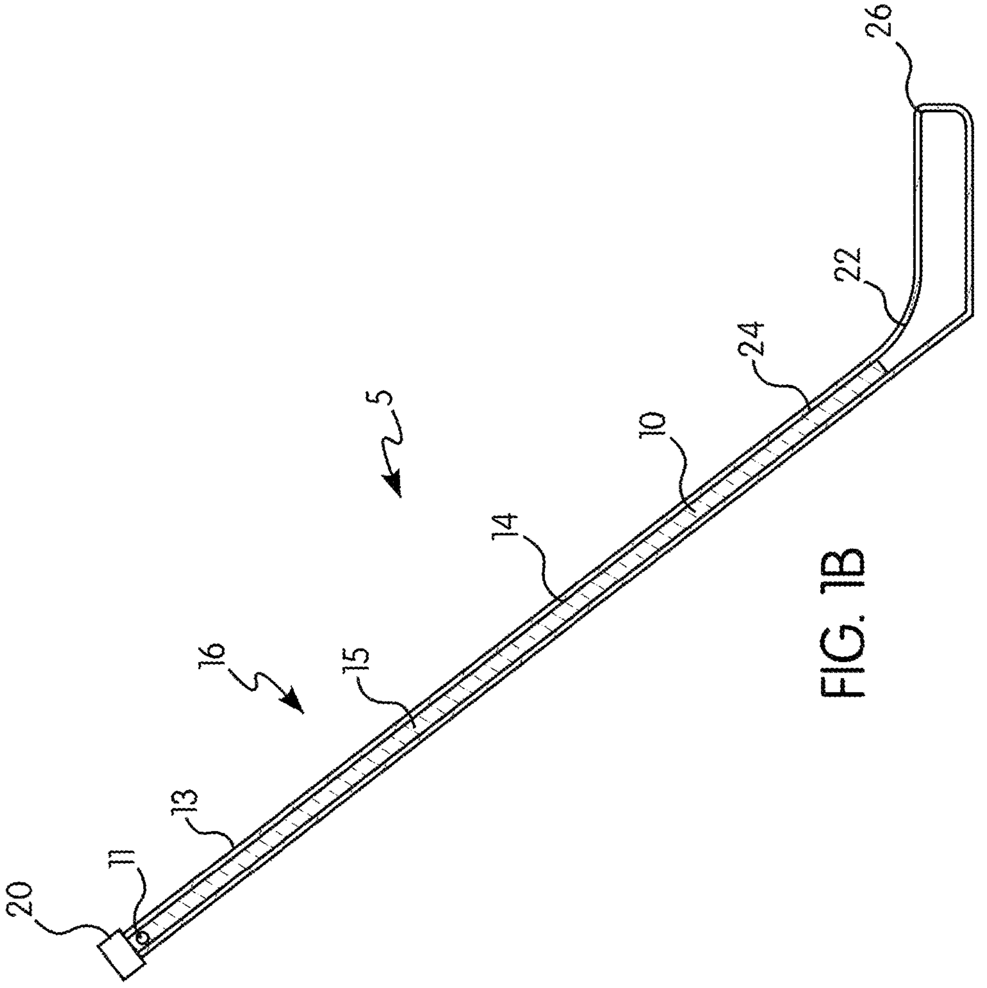
FIG. 1B shows a side cross-sectional view of the ice hockey stick of FIG. 1A with the internal cavity at least partially filled with a weight.

As used herein, the singular form of "a", "an", and "the" include plural referents unless the context clearly dictates otherwise.

Spatial or directional terms, such as "left", "right", "inner", "outer", "above", "below", and the like, relate to the disclosure as shown in the drawing figures and are not to be considered as limiting as the disclosure can assume various alternative orientations.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

The term "at least" is synonymous with "greater than or equal to".

The term "not greater than" is synonymous with "less than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The present disclosure is directed to weighted training equipment and a method of making such equipment. The weighted training equipment may include any device used in playing a sport that has a hollow shaft including, but not limited to sticks (including ice hockey, roller hockey, field hockey, floor ball, and lacrosse sticks), golf clubs, ski poles (including cross-country and downhill poles), rackets (including tennis, racquetball, squash, and badminton rackets), and bats (including softball and baseball bats); any device used for physical therapy including, but not limited to, a walker, a cane, or crutches; and any other equipment from which the user would benefit from temporarily or permanently adding weight to the equipment. Unlike other weight-based strength and training products that are temporary and unbalanced, the present disclosure results in increased weight being distributed evenly to a desired portion or portions of a hollow shaft of the training equipment in a permanent manner. The evenly distributed, added weight also improves the overall physical characteristics of the training equipment, such as strength and flexibility. For example, the breaking point of the training equipment may be increased due to the flexibility of the added weight allowing the training equipment to withstand a greater force during use. This further increases the benefits of the training equipment as an athlete can practice against a greater resistance and strain with the weighted training equipment of the present disclosure.

Figure 1A:
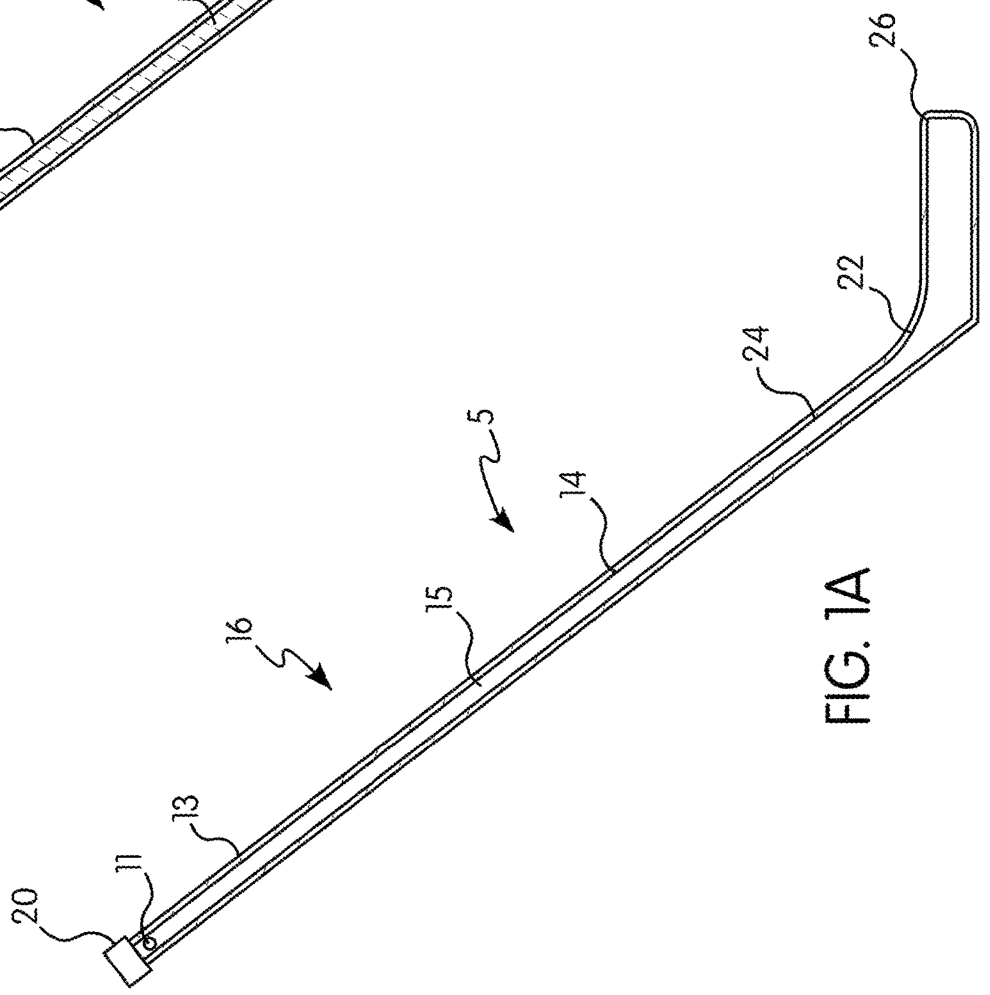
FIG. 1A shows a side cross-sectional view of an ice hockey stick having a hollow shaft with an empty internal cavity.
Figure 1C:
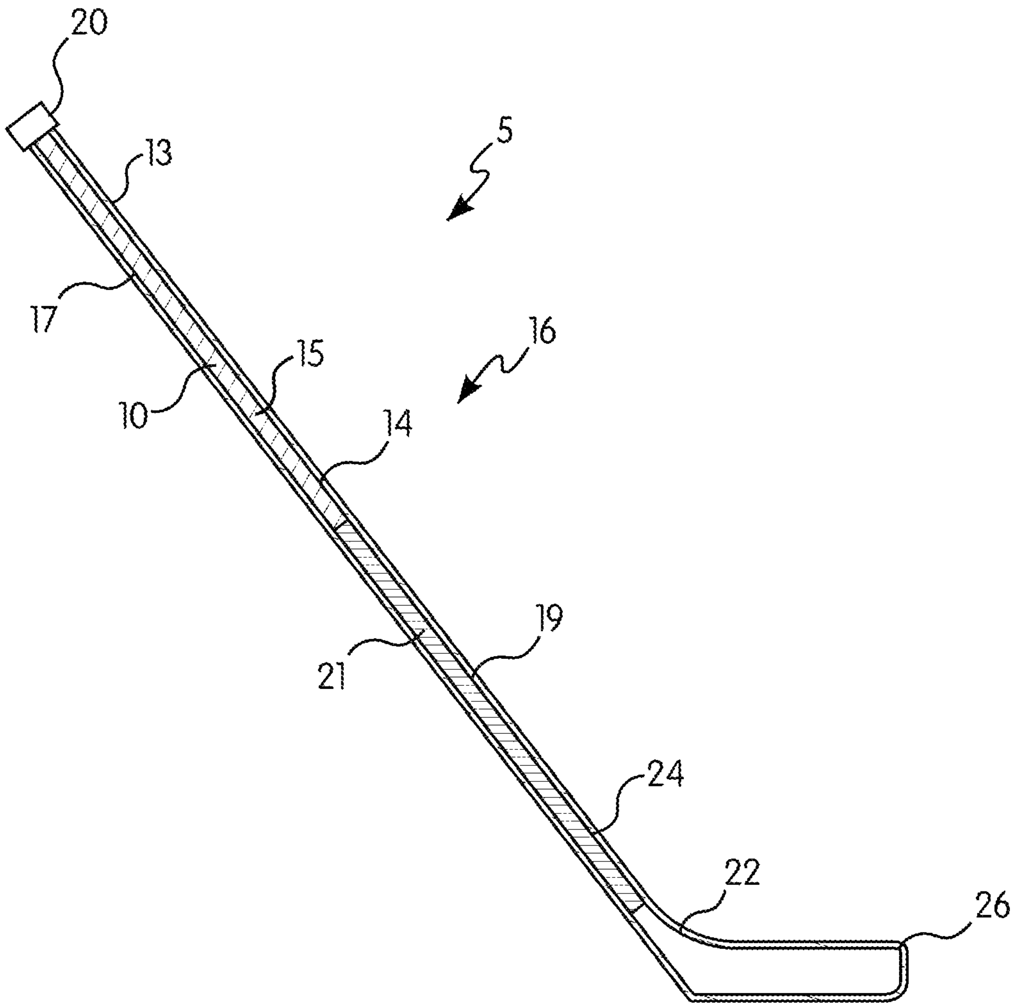
FIG. 1C shows a side cross-sectional view of the ice hockey stick of FIG. 1A with a first portion of the internal cavity at least partially filled with the weight and a second portion of the internal cavity at least partially filled with a filler or a spacer.

Referring to FIGS. 1A-1C, in some embodiments or aspects, a weighted training equipment 5 may be in the form of an ice hockey stick 16. The ice hockey stick 16 includes a hollow shaft 14 extending from a first butt end 20 to a second hosel end 22. The hollow shaft 14 may have a taper 24 adjacent the second hosel end 22. The hollow shaft 14 has a sidewall 13 extending along the shaft length from the first butt end 20 to the second hosel end 22 defining an internal cavity 15. A blade 26 extends from the second hosel end 22. The blade 26 is configured for engaging a hockey puck during play. In some embodiments or aspects, the hollow shaft 14 may be a fixed component of the ice hockey stick 16 such that the shaft 14 and the blade 26 constitute a single piece. In other embodiments or aspects, the hollow shaft 14 may be a separate component that is removably or non-removably attached to the blade 26.

With reference to FIG. 1B, at least a portion of an internal cavity 15 of the shaft 14 may be filled with a weight 10. An opening 11 into the hollow shaft 14 may be provided through the sidewall 13 in order to provide the added weight 10 to the hockey stick 16. In some embodiments or aspects, the internal cavity 15 may be filled with the weight 10 along its entire length, as shown in FIG. 1B, from the first butt end 20 to the second hosel end 22. In other embodiments or aspects, such as shown in FIG. 1C, the internal cavity 15 may be partially filled with the weight 10 such that the weight 10 only fills a portion of the shaft 14.

With reference to FIG. 1C, in some embodiments or aspects, a plug or spacer 21 may be used in combination with the weight 10. The weight 10 may fill a first portion of the internal cavity 15, while the plug or spacer 21 may fill a second portion of the internal cavity 15 not occupied by the weight 10. As shown in FIG. 1C, in embodiments or aspects where an upper portion 17 of the hollow shaft 14 proximate to the butt end 20 is filled with the weight 10, the plug or spacer 21 may be added into a lower portion 19 of hollow shaft 14 proximate to the hosel end 22 prior to the injection to ensure the weight 10 is only added to the upper portion 17 of hollow shaft 14. In some embodiments or aspects, the arrangement of the weight 10 and the plug or spacer 21 shown in FIG. 1C may be reversed. In some embodiments or aspects, the plug or spacer 21 may keep a polymer material of the weight 10 in the hollow shaft 14 until the polymer material is completely cured and solidified. The plug 21 may be left in place or removed after the polymer material has cured and solidified.

Figure 2A:
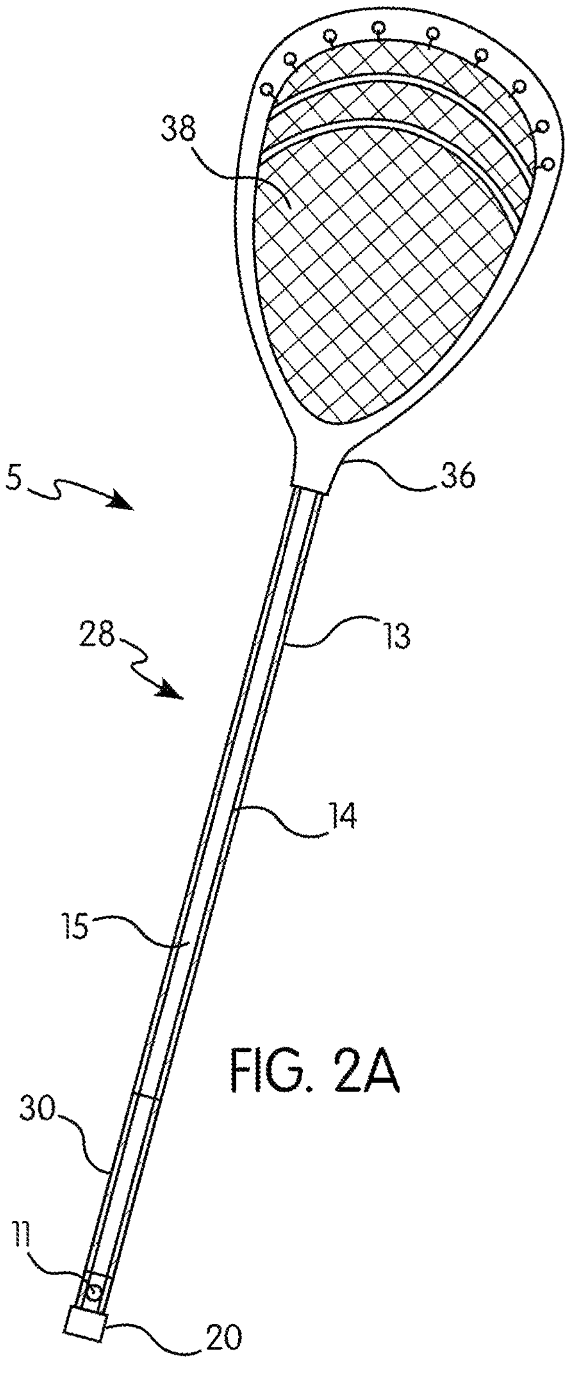
FIG. 2A shows a side cross-sectional view of a lacrosse stick having a hollow shaft with an empty internal cavity.
Figure 2B:
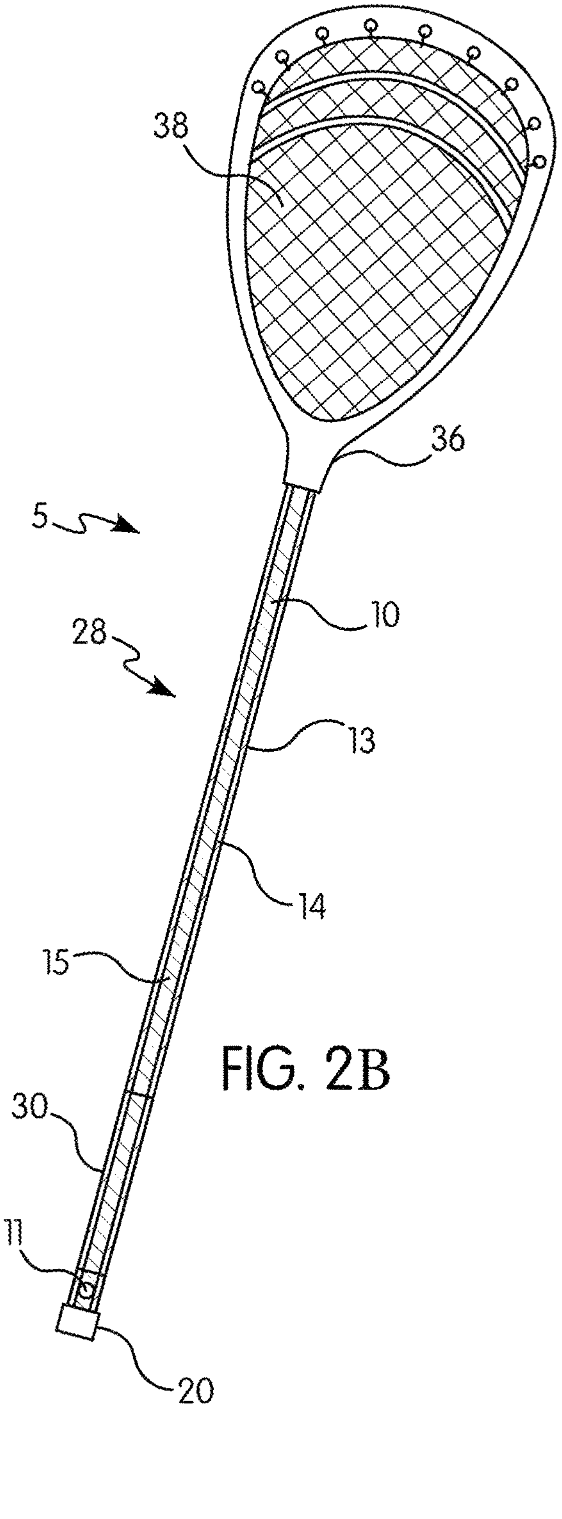
FIG. 2B shows a side cross-sectional view of a lacrosse stick in FIG. 2A with the internal cavity at least partially filled with a weight.

Referring to FIGS. 2A and 2B, another embodiment of the weighted training equipment 5 is a lacrosse stick 28. The lacrosse stick 28 includes a handle 30 comprising a hollow shaft 14, defined by sidewall 13, extending from a first butt end 20 to a second neck end 36. The sidewall 13 of the hollow shaft 14 defines an internal cavity 15 that extends from the first butt end 20 to the second neck end 36. A pocket 38 extends from the second neck end 36. The pocket 38 is configured for receiving the ball therein during play. The handle 30 may be a separate component that is attached to the pocket 38. In some embodiments or aspects, the handle 30 is monolithically formed with the pocket 38. Similar to the weighted training equipment shown in FIGS. 1A-1C, the internal cavity 15 of the hollow shaft 14 may be filled with the added weight 10 along its entire length from the first butt end 20 to the second neck end 36. In some embodiments or aspects, the internal cavity 15 may be partially filled with the weight 10 such that the weight 10 only fills a portion of the hollow shaft 14. An opening 11 into the hollow shaft 14 may be provided through the sidewall 13 in order to provide the added weight 10 to the lacrosse stick 28.

In some embodiments or aspects, such as shown in FIGS. 3A-3D, the weighted training equipment is a baseball bat 40. The baseball bat 40 includes a hollow shaft 14 defined by a sidewall 13. The hollow shaft 14 and sidewall 13 extend from a first end 44 including a gripping section 46 to a second end 48. The sidewall 13 of the hollow shaft 14 further defines an internal cavity 15 extending from the first end 44 to the second end 48. The first end 44 of the hollow shaft 14 is covered by a knob 50, and the second end 48 of the hollow shaft 14 is covered by an end cap 52. The internal cavity 15 may be filled with the polymer material along its entire length from the first end 44 to the second end 48.

Figure 3A:
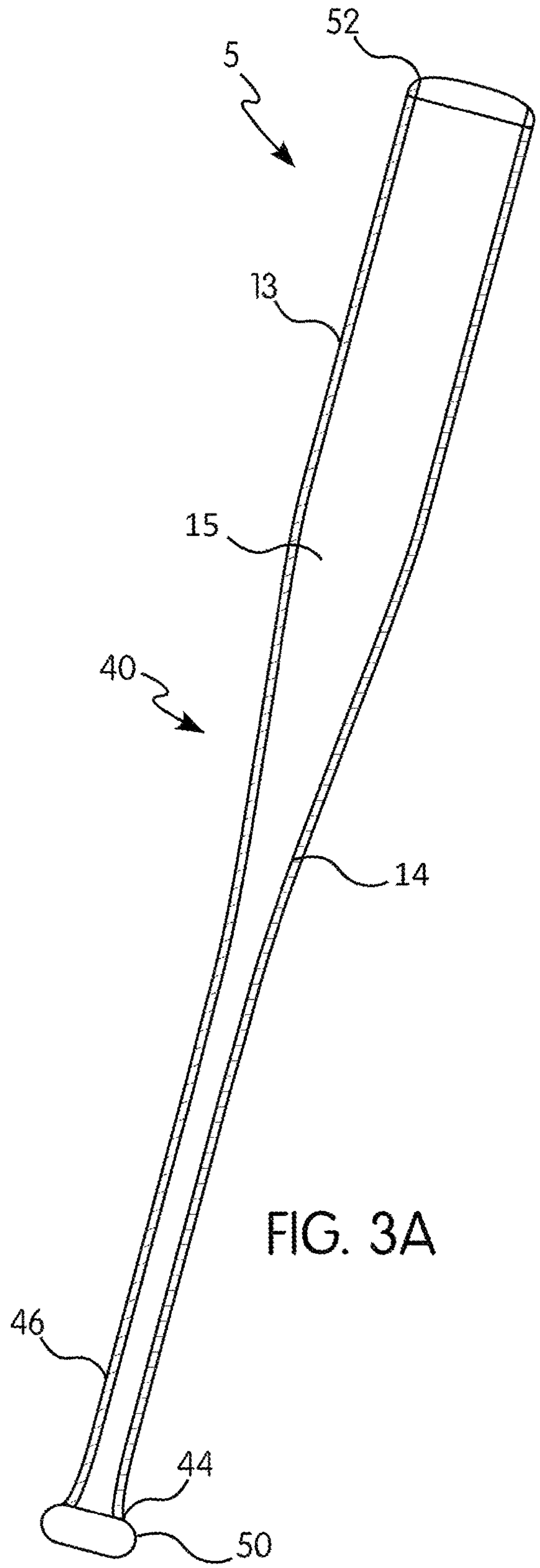
FIG. 3A shows a side cross-sectional view of a baseball bat with an empty internal cavity.
Figure 3B:
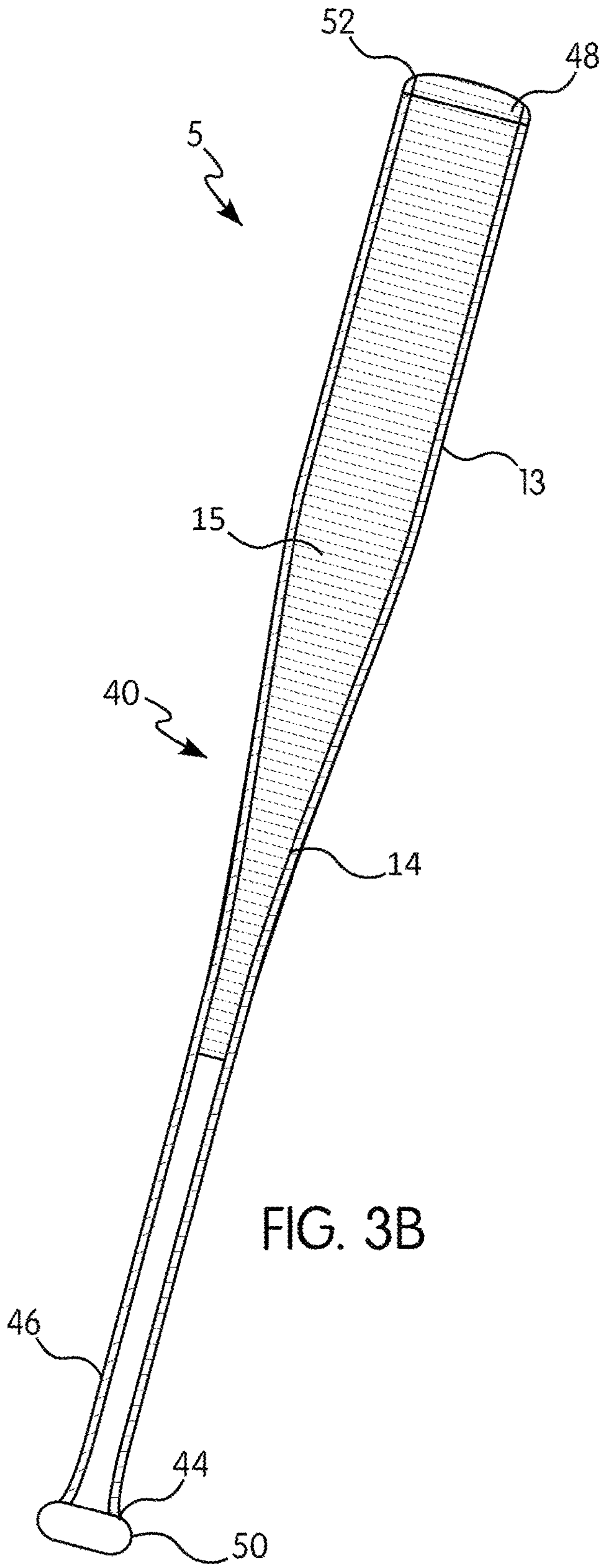
FIG. 3B shows a side cross-sectional view of the baseball bat shown in FIG. 3A with the internal cavity at least partially filled with a weight.

Other embodiments or aspects include training equipment 5 where only a portion of the internal cavity 15 is filled with the polymer material to provide the weight 10 in only a specific area of the equipment. As shown in FIG. 3B, for example, the polymer material may be provided only at the second end 48 of the internal cavity 15 of the baseball bat 40 to provide the weight 10 at the end farthest away from the gripping section 46 of the baseball bat 40. The polymer material may also be provided only at the first end 44 of the internal cavity 15 to provide the weight 10 and resistance at the end closest to the gripping section 46 of the baseball bat 40. In this case, a plug or spacer 21 may be added to the baseball bat as described above and shown in FIG. 1C.

Figure 3C:
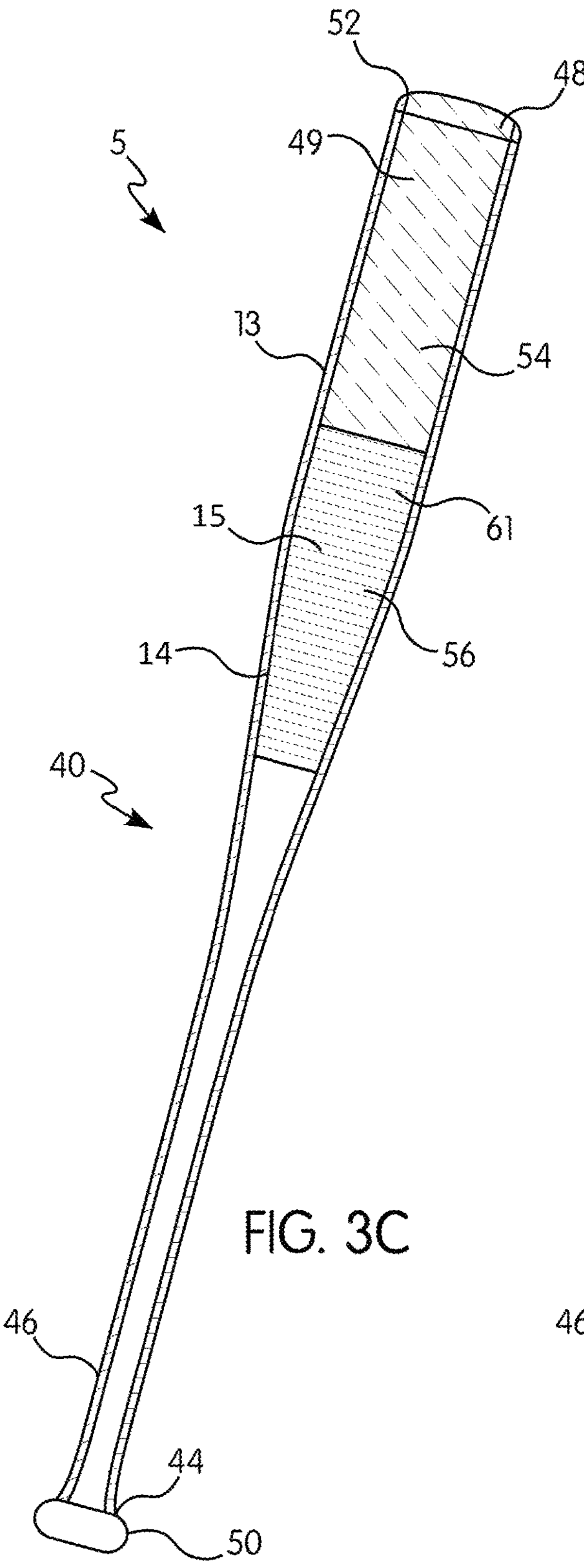
FIGS. 3C and 3D show side cross-sectional views of the baseball bat shown in FIG. 3A after the injection and curing of at least two polymer materials in the shaft according to the present disclosure.

If different weights are desired in different portions of the internal cavity, multiple polymer materials having different densities may be injected into the hollow shaft at desired locations. Referring now to FIG. 3C, a first polymer material 54 having a first density may be injected into a first portion 49 of the internal cavity 15 and a second polymer material 56 having a second density may be injected into a second portion 61 of the internal cavity 15. If the first portion 49 of the internal cavity 15 and the second portion 61 of the internal cavity 15 are adjacent to each other, the second polymer material 56 may be injected into the second portion 61 of the internal cavity 15 after the first polymer material 54 has been cured in the first portion 49 of the internal cavity 15. The densities of the first and second polymer materials may be adjusted using fillers as described above.

Furthermore, in embodiments or aspects where it is desired that only a portion of the internal cavity 15 is filled with the polymer material in order to provide the added weight 10 in only a specific area of the equipment 5, a polymer material mixed with a lightweight filler may be used in place of a plug or spacer 21. The polymer material may be mixed with lightweight filler to a degree where the added weight of the mixed polymer material-filler combination is less than the added weight of the polymer material without the lightweight filler. The polymer material without the added, lightweight filler may be still be mixed with a filler in order to increase its desired density and weight. The polymer material mixed with lightweight filler is injected into internal cavity 15 and allowed to cure. Then the heavier polymer material is injected into internal cavity 15 and allowed to cure. This embodiment adds more weight 10 to the internal cavity 15 than if a plug or spacer 21 was used. However where the use of a plug or spacer 21 is not practicable, for example, in use of hollow shafts 14 that are curved or have an irregularly shaped diameter, this embodiment still permits a user to concentrate extra weight at a precise location along the hollow shaft.

Figure 3D:
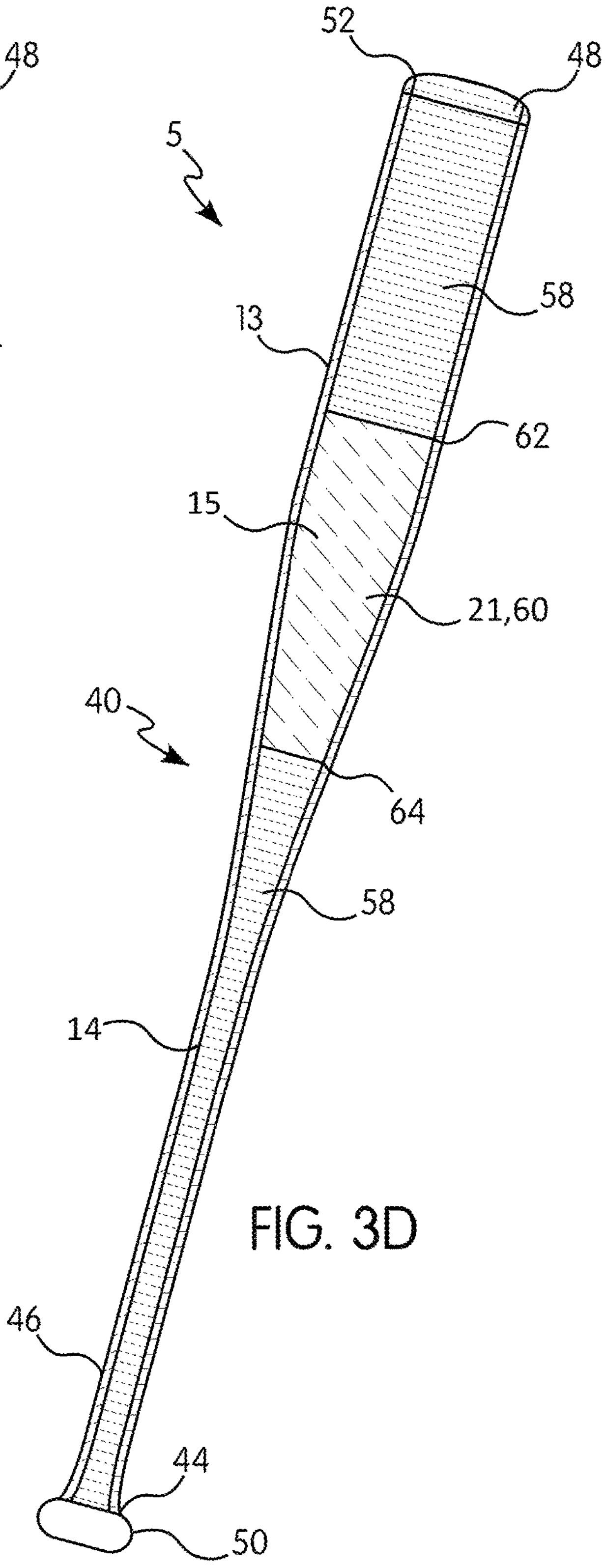

Referring to FIG. 3D, it may be desired that weight be added to both the first 44 and second 48 ends of the internal cavity 15. In this embodiment or aspect, a polymer material having a first density 58 is injected into the second end 48 of the internal cavity 15 until it reaches a first desired location 62 and allowed to cure. Then, a plug or spacer 21 is placed into the internal cavity 15, so that it reaches a second desired location 64. Alternatively, a polymer material having a second density 60 may be injected into the internal cavity 15 up to the second desired location 64 and allowed to cure. Finally, the polymer material having a first density 58 is injected again into the internal cavity 15 until it reaches the first end 44. The desired location of each polymer material need not be fixed at certain locations along the internal cavity 15 but can be located anywhere along the internal cavity 15 according to the athlete's preference. Any number of layers of polymer materials or plugs or spacers 21 can be used. This configuration of polymer materials within the hollow shaft is not limited in application to baseball bat 40, but it can also be used with any equipment described herein, such as lacrosse stick 28 shown in FIGS. 2A-2B or hockey stick 16 shown in FIGS. 1A-1C.

Figure 4B:
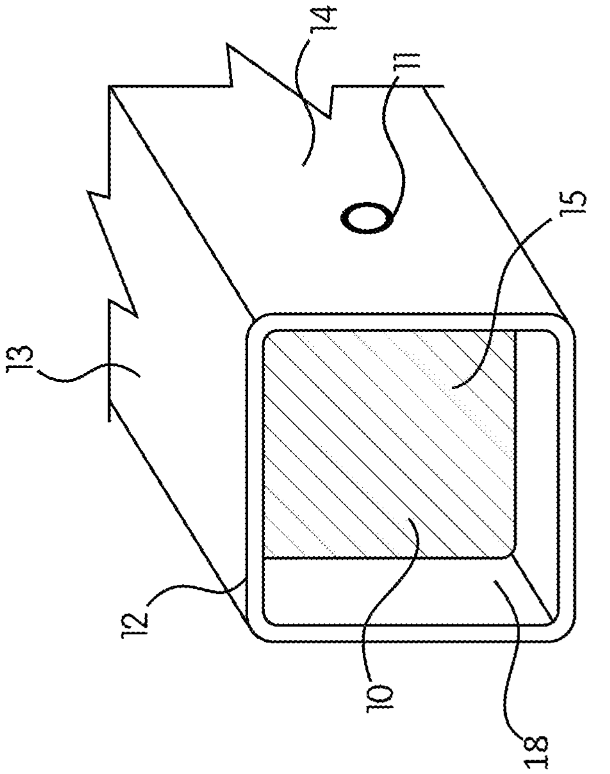
FIG. 4B shows a perspective view of the open end of the shaft shown in FIG. 4A, with the internal cavity at least partially filled with a weight.
Figure 4A:
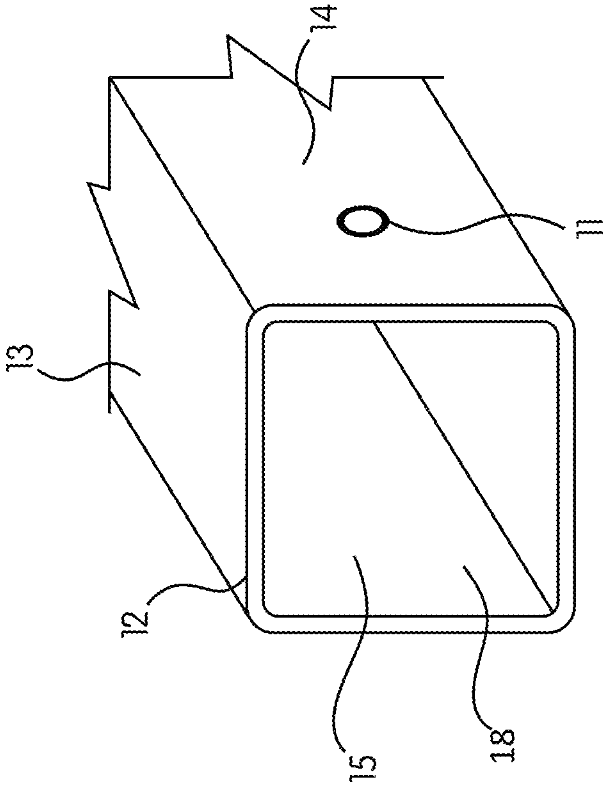
FIG. 4A shows a perspective view of an open end of a shaft of a piece of training equipment with an empty internal cavity.
Figure 5B:
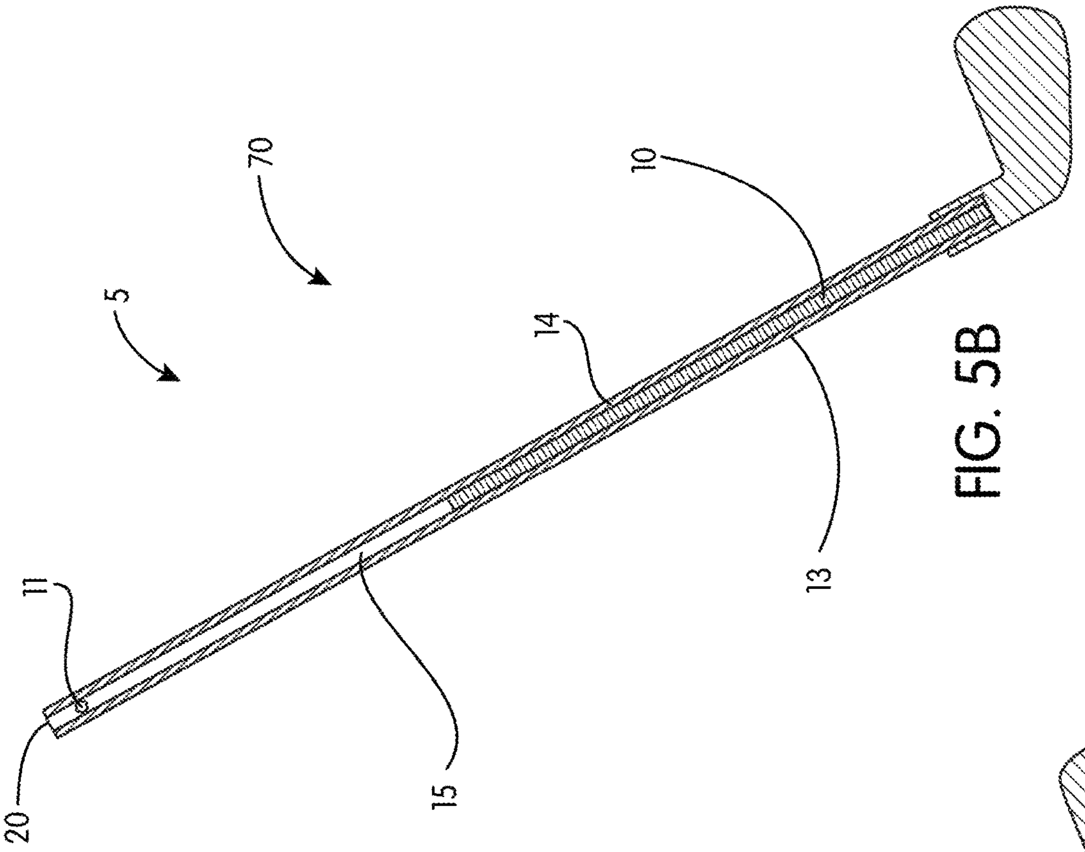
FIG. 5B shows a side cross-sectional view of the golf club of FIG. 5A with the internal cavity at least partially filled with a weight.
Figure 5A:
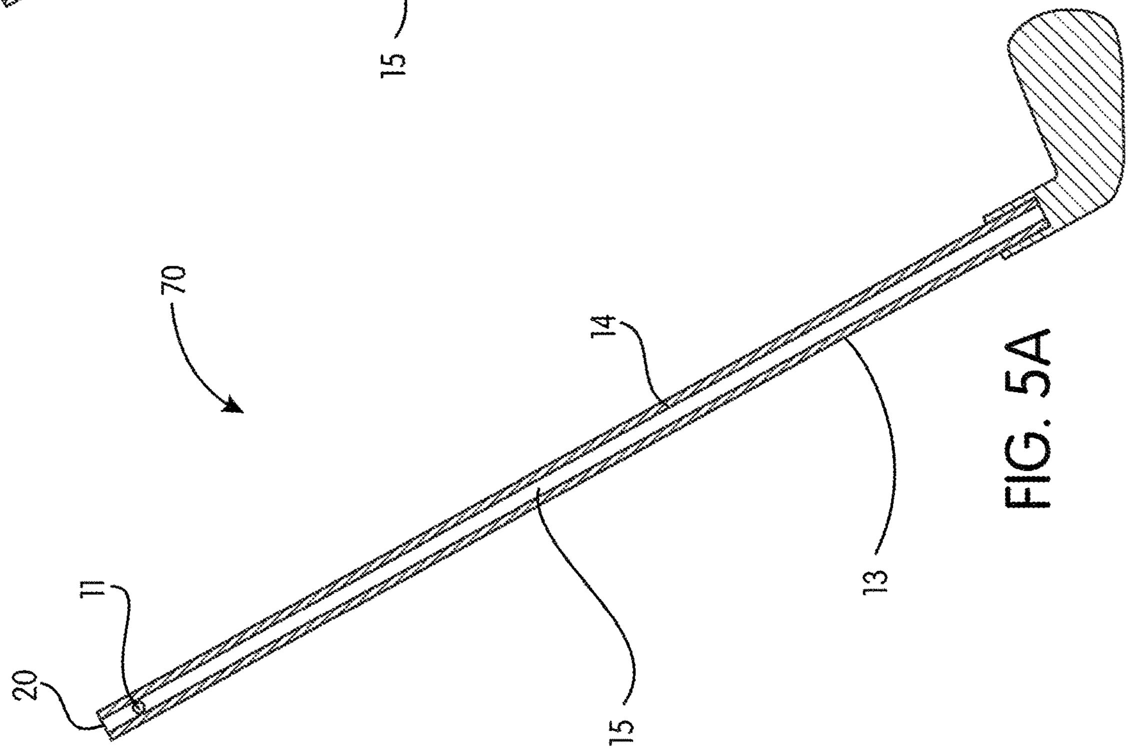
FIG. 5A shows a side cross-sectional view of a golf club with an empty internal cavity.

Referring to FIGS. 4A and 4B, an open end 12 of a hollow shaft 14 for use with weighted training equipment, such as the weighted training equipment of FIGS. 1A-3D or physical therapy equipment such as a walker or crutch, is configured for receiving the weight 10 therein to at least partially fill the internal cavity 15. The hollow shaft 14 is defined by sidewall 13 and extends along a length as determined by the type of weighted training equipment in use. An initially empty internal cavity 15 (FIG. 4A) is at least partially filled with the weight 10 (FIG. 4B) to selectively add weight to the hollow shaft 14 of the training equipment 5. The weight 10 is added into the internal cavity 15 through an opening 18 of the open end 12 of the hollow shaft 14 and/or through an opening 11 extending through the sidewall 13 of the hollow shaft 14. In some embodiments or aspects, the weight 10 may be added to the internal cavity 15 of the hollow shaft 14 during the original manufacture of the training equipment or may be added to the internal cavity 15 of the hollow shaft 14 of existing training equipment at a later date. This may be accomplished by removing an end cap from the hollow shaft, cutting a closed end from the hollow shaft, drilling a hole in the hollow shaft, or using any other suitable method to provide the opening 11, 18 in the hollow shaft 14, so that the polymer material can be injected into the internal cavity 15 of the hollow shaft 14 through the opening 11, 18.

In some embodiments or aspects, the hollow shaft 14 may be made from materials including, but not limited to, fiberglass, Kevlar®, carbon fiber composite, metals including aluminum, steel, and titanium, and any combination thereof.

In some embodiments or aspects, the added weight 10 may be a polymer material. In some embodiments or aspects, the polymer material may be a visco-elastic polymer, such as a solid cast polyurethane elastomer. In some embodiments or aspects, the polyurethane elastomer may be IsoGel®, available from Pittsburgh Plastics Manufacturing of Butler, Pennsylvania. The polymer material has a first density.

In some embodiments or aspects, the polymer material may include a filler to increase the volume of material that defines the weight 10, along with increasing or decreasing its density.

In some embodiments or aspects, the filler may have a second density that may be different than that of the first density of the polymer material. As the size of the hollow shaft 14, length and diameter, varies, the volume of the internal cavity 15 also changes. Therefore, the weight increase of a particular piece of training equipment will depend on the dimensions of the hollow shaft 14 and the amount and density of polymer material contained within the hollow shaft 14. If the desired weight increase cannot be achieved by injecting the polymer material alone, the filler may be included with the polymer material to increase the density and/or volume of the resulting mixture of the polymer material and the filler, thereby allowing for a greater weight increase for a given volume within the hollow shaft 14. For example, for training equipment with hollow shafts 14 having the same diameter, but different lengths, a filler may be included with the polymer material provided in the shorter shaft so that the weight increase for the equipment having the shorter shaft will be the same as the weight increase for the equipment having the longer shaft and including a polymer material with no filler. Likewise, for training equipment with hollow shafts 14 having the same length, but different diameters, a filler may be included with the polymer material provided in the equipment having the smaller diameter shaft so that the weight increase for the equipment having the smaller diameter shaft will be the same as the weight increase for the equipment having the larger diameter shaft and including a polymer material with no filler. To increase the density of the weight 10, the filler may be an iron powder or other metal powders, or any material having a density of at least 0.070 pounds per fluid ounce.

Thus, by using fillers, for any given volume available within the hollow shaft 14, the increased weight of the training equipment may be adjusted to provide a specific desired increase in weight or an increase in weight based on the athlete's preference and the amount of hollow space available within the hollow shaft 14.

In some embodiments or aspects, if a desired weight increase cannot be achieved by injecting the polymer material alone, a filler may be included with the polymer material. The filler may have a density that is less than that of the polymer material. When the lightweight filler is added to the polymer material, the filler reduces the density of the resulting mixture such that the added weight, for a given volume, is less the weight of the polymer material filling the same volume. This arrangement may be desirable for use by children, as the training equipment 5 still has weight 10 evenly added in the hollow shaft 14, but the added weight 10 is not so heavy that it prevents the training equipment 5 from being used properly.

As the size of the hollow shaft 14, length and diameter, varies, the volume of the internal cavity 15 also changes. If the desired weight increase cannot be achieved by injecting the polymer material alone, the filler may be included with the polymer material to decrease the density allowing for a lesser weight increase for a given volume within the hollow shaft 14 than had the polymer material been included by itself. For example, for training equipment with hollow shafts 14 having the same diameter, but different lengths, a lightweight filler may be included with the polymer material provided in the longer shaft so that the weight increase for the equipment having the longer shaft will be the same as the weight increase for the equipment having the shorter shaft having a polymer material with no filler. Likewise, for training equipment with hollow shafts 14 having the same length, but different diameters, a lightweight filler may be included with the polymer material provided in the equipment having the larger diameter shaft so that the weight increase for the equipment having the larger diameter shaft will be the same as the weight increase for the equipment having the smaller diameter shaft having the polymer material with no filler. To decrease the density of weight 10, the filler may be polyethylene or any other polymer material having a density of not more than 0.060 pounds per fluid ounce.

Addition of a filler or a lightweight filler to polymer material may have different advantages in different embodiments, as described herein. The polymer material may be provided as two components that remain liquid until cured. After curing, the cured composition forms a polymer material having gel-like properties. In some embodiments or aspects, the two components of the curable composition may be a polyisocyanate (di-, tri- or higher isocyanate functional component) and a polyol, but other polymer materials that are known and conducive to curing may also be used. In some embodiments or aspects, a filler may be added as a third component of the curable composition, to change the density of the curable composition and mix homogenously with the composition. It is further contemplated that the filler may be used independently of the curable composition. In this case, the filler may still be selected from materials such as polyethylene or metal powders, but other materials such as foam plugs or nylon or plastic spacers may also be used.

After mixing the two components of the curable composition, with or without the filler, the curable composition is injected into the training equipment 5 as the weight 10. The curable composition is injected into the internal cavity 15 of the training equipment 5 to fill all or part of the hollow shaft 14 and allowed to cure. After curing, the polymer material is a permanent semi-solid material in the form of the weight 10, with the polymer material conforming to the shape of the interior portion of the sidewall 13 of the hollow shaft 14. Due to the polymer material evenly filling the internal cavity 15 of the hollow shaft 14, the added weight 10 is evenly distributed throughout the hollow shaft 14.

Table 1 below shows an increase in weight achieved by filling the internal cavity 15 of the hollow shaft 14 of various-sized ice hockey sticks 16, an example of which is shown in FIGS. 1A-1B, with a polymer material along its entire length from the first butt end 20 to the second hosel end 22.

TABLE 1

| UN-CUT STICK SIZE | MAXIMUM VOLUME (fl. oz.) | INCREASED WEIGHT (lb.) | INCREASED WEIGHT (gm.) |
|---|---|---|---|
| Senior | 20.0 | 1.250 | 567.0 |
| Intermediate | 18.0 | 1.125 | 510.3 |
| Junior | 14.0 | 0.875 | 396.9 |

A further weight increase may be achieved by adding a filler to the polymer material to increase the density of the weight 10.

Table 2 below shows an increase in weight achieved by filling the internal cavity 15 of the hollow shaft 14 of various-sized lacrosse sticks 28, an example of which is shown in FIGS. 2A-2B, with a polymer material along its entire length from the first butt end 20 to the second neck end 36.

TABLE 2

| UN-CUT SHAFT SIZE | MAXIMUM VOLUME (fl. oz.) | INCREASED WEIGHT (lb.) | INCREASED WEIGHT (gm.) |
|---|---|---|---|
| Attack | 10.0 | 0.625 | 283.5 |
| Defense | 20.0 | 1.250 | 567.0 |

While specific embodiments of the device of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the device of the present disclosure which is to be given the full breadth of the claims appended and any and all equivalents thereof.

What is claimed is:

1. A baseball training bat comprising:

an elongated shaft having a portion of its interior being removed, defining an internal cavity; and at least one added weight made from a polymer material that is formed in only the portion of the internal cavity to provide the added weight in only a specific area of the elongated shaft, wherein the portion extends a length that is less than the entire length of the elongated shaft;

wherein the added weight is configured to be cured to a sidewall of the internal cavity, wherein the weight of the baseball training bat with the cured polymer material is greater than the weight of the baseball training bat that does not have its interior removed, wherein the added weight is distributed evenly along the portion of the internal cavity over which the added weight is distributed.

2. The baseball training bat of claim 1, wherein at least a portion of an outer surface of the baseball training comprises a gripping section configured to be engaged by a user.

3. The baseball training bat of claim 2, wherein the portion of the internal cavity having the added weight at least partially overlaps the gripping section.

4. The baseball training bat of claim 3, wherein the portion of the internal cavity having the added weight entirely overlaps the entire gripping section.

5. The baseball training bat of claim 2 comprising a barrel section opposing the gripping section.

6. The baseball training bat of claim 5, wherein the portion of the internal cavity having the added weight extends at least partially through the barrel section.

7. The baseball training bat of claim 1, wherein the added weight is made from a first polymer material and a second polymer material, and wherein a mixture of the first polymer material and the second polymer material is cured directly to the sidewall.

* * * * *